United States Patent
Dean et al.

(10) Patent No.: US 11,249,960 B2
(45) Date of Patent: Feb. 15, 2022

(54) TRANSFORMING DATA FOR A TARGET SCHEMA

(71) Applicant: International Business Machines Corporation, Armonk, NY (US)

(72) Inventors: Daniel Dean, Yorktown Heights, NY (US); Checed A. Rodgers, Bellevue, WA (US); Dingcheng Li, Sunnyvale, CA (US); Pei Ni Liu, Beijing (CN); Xiao Xi Liu, Beijing (CN); Hui Lei, Scarsdale, NY (US); Yu Gu, Cedar Park, TX (US); Jing Min Xu, Beijing (CN); Yaoping Ruan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 16/004,863

(22) Filed: Jun. 11, 2018

(65) Prior Publication Data

US 2019/0377807 A1  Dec. 12, 2019

(51) Int. Cl.
*G06F 16/21* (2019.01)
*G06F 16/84* (2019.01)
*G06F 16/25* (2019.01)

(52) U.S. Cl.
CPC .......... *G06F 16/211* (2019.01); *G06F 16/258* (2019.01); *G06F 16/84* (2019.01)

(58) Field of Classification Search
CPC ....... G06F 16/211; G06F 16/84; G06F 16/258
See application file for complete search history.

(56) References Cited

U.S. PATENT DOCUMENTS

| | | | | |
|---|---|---|---|---|
| 7,149,746 | B2* | 12/2006 | Fagin | G06F 16/258 707/756 |
| 7,590,647 | B2* | 9/2009 | Srinivasan | G06F 40/177 |
| 7,599,952 | B2* | 10/2009 | Parkinson | G06F 40/216 |
| 7,707,169 | B2* | 4/2010 | Comaniciu | G06F 19/321 707/602 |

(Continued)

OTHER PUBLICATIONS

Alexe, Bogdan, et al., "Designing and refining schema mappings via data examples", Proceedings of the 2011 ACM SIGMOD International Conference on Management of data. ACM, 2011.

(Continued)

*Primary Examiner* — Pierre M Vital
*Assistant Examiner* — Zuheir A Mheir
(74) *Attorney, Agent, or Firm* — Steven M. Bouknight

(57) ABSTRACT

Embodiments generally relate transforming data for a target schema. In some embodiments, a method includes receiving input data, where the input data includes a plurality of segments, and where the segments include a plurality of source fields containing target data. The method further includes characterizing the input data based at least in part on a plurality of predetermined metrics, where the predetermined metrics determine a structure of the input data. The method further includes mapping the target data in the source fields of the segments to a plurality of target fields of a target schema based at least in part on the characterizing. The method further includes populating the target fields of the target schema with the target data from the source fields based at least in part on the mapping.

16 Claims, 7 Drawing Sheets

(56) References Cited

U.S. PATENT DOCUMENTS

| | | | | |
|---|---|---|---|---|
| 7,720,873 | B2* | 5/2010 | Loving | G06F 16/213 |
| | | | | 707/802 |
| 7,827,125 | B1* | 11/2010 | Rennison | G06F 16/3332 |
| | | | | 706/14 |
| 9,535,902 | B1* | 1/2017 | Michalak | G06F 40/30 |
| 2006/0053133 | A1* | 3/2006 | Parkinson | G06F 40/216 |
| 2007/0073745 | A1* | 3/2007 | Scott | G06F 16/374 |
| 2008/0021912 | A1* | 1/2008 | Seligman | G06F 16/36 |
| 2008/0126080 | A1* | 5/2008 | Saldanha | G06F 16/258 |
| | | | | 704/9 |
| 2008/0281820 | A1* | 11/2008 | Do | G06F 16/84 |
| 2010/0057673 | A1* | 3/2010 | Savov | G06F 16/258 |
| | | | | 707/E17.002 |
| 2011/0066585 | A1* | 3/2011 | Subrahmanyam | G06N 7/005 |
| | | | | 706/52 |
| 2014/0280352 | A1* | 9/2014 | Sam | G06F 16/86 |
| | | | | 707/793 |
| 2015/0200858 | A1* | 7/2015 | Zhuang | H04L 47/22 |
| | | | | 709/205 |
| 2015/0332010 | A1 | 11/2015 | Olson et al. | |
| 2016/0019244 | A1 | 1/2016 | Liu et al. | |
| 2016/0140236 | A1 | 5/2016 | Estes | |
| 2016/0300019 | A1 | 10/2016 | Baluta | |
| 2017/0012818 | A1* | 1/2017 | Suragi Math | H04L 41/085 |
| 2017/0242907 | A1* | 8/2017 | Goris | G06F 16/285 |
| 2017/0371958 | A1* | 12/2017 | Ganjam | G06F 40/216 |
| 2018/0052870 | A1* | 2/2018 | Stojanovic | G06F 16/211 |

OTHER PUBLICATIONS

Alexe, Bogdan, et al., "Muse: Mapping understanding and design by example", 2008 IEEE 24th International Conference on Data Engineering, 2008.

Bellahsene, Zohra, et al., "Schema matching and mapping", vol. 57. Heidelberg (DE), Springer, 2011.

Berlin, Jacob, et al., "Database schema matching using machine learning with feature selection", International Conference on Advanced Information Systems Engineering, Springer Berlin Heidelberg, 2002.

Bernstain, Philip A., et al. "Generic schema matching, ten years later", Proceedings of the VLDB Endowment 4.11, pp. 695-701, 2011.

Bernstain, Philip A., et al., "Interactive schema translation with instance-level mappings", Proceedings of the 31st International conference on very large data bases, pp. 1283-1286, Jan. 2005.

Doan, Anhai, et al., "Learning Source Description for Data Integration", WebDB Informal Proceedings, 2000.

Doan, Anhai, et al., "Reconciling schemas of disparate data sources: A machine-learning approach", ACM Sigmod Record. vol. 30. No. 2, ACM, 2001.

Drumm, Christian, et al. "QuickMig—Automatic Schema Matching for Data Migration Projects", Proceedings of the sixteenth ACM conference on information and knowledge management, ACM, 2007.

Duan, Song, et al, "One size does not fit all: Customizing Ontology Alignment Using User Feedback", The Semantic Web—International Semantic Web Conference, pp. 177-192, 2010.

Duan, Songyun, et al., "A Clustering-based Approach to Ontology Alignment", The Semantic Web—International Semantic Web Conference, pp. 146-161, 2011.

Duan, Songyun, et al., "Instance-Based Matching of Large Ontologies Using Locality-Sensitive Hashing", The Semantic Web—International Semantic Web Conference, pp. 49-64, 2012.

Ellis, Jason, et al., "Exploring Big Data with Helix: Finding Needles in a Big Haystack", ACM SIGMOD Record archive, pp. 43-54, vol. 43, No. 4, Dec. 2014.

Elmeleegy, H., et al., "Usage-based schema matching", Proceedings of ICDE conference, IEEE Computer Society, pp. 20-29, 2008.

Hernandez, Mauricio A., et al., "Clio: A semi-automatic tool for schema mapping", ACM SIGMOD Record 30.2, p. 607, 2001.

McDonald, John H., "Correlation and linear regression", Handbook of Biological Statistics, pp. 190-208, http://www.biostathandbook.com/linearregression.html, Jul. 20, 2015.

McDonald, John H., "Simple logistic regression", Handbook of Biological Statistics, pp. 238-246, http://www.biostathandbook.com/simplelogistic.html, Jul. 20, 2015.

Quora, "What Is the difference between linear regression and least squares" Quora, https://www.quora.com/What-is-the-difference-between-linear-regression-and-least-squares, [retrieved May 12, 2018].

Rahm, Erhard, et al., "A survey of approaches to automatic schema matching", VLDB Journal: Very Large Data Bases, 10(4), pp. 334-350, 2001.

Yan, Ling Ling, et al., "Data-driven understanding and refinement of schema mappings", ACM SIGMOD Record, vol. 30. No. 2. ACM, 2001.

Zumel, Nina, "The Simpler Derivation of Logistic Regression", Win-Vector Blog, http://www.win-vector.com/blog/2011/09/the-simpler-derivation-of-logistic-regression/, Sep. 14, 2011.

\* cited by examiner

| Target Schema elements 602 | Target Fields 604 | Confidence Values 606 |
|---|---|---|
| === Schema Elements === | | |
| ( 0 ) Person | | |
|   ( 1 ) personID | [31240040] | [100.00%] |
|   ( 2 ) humanName | | |
|     ( 3 ) given | [John] | [100.00%] |
|     ( 4 ) middle | [-----] | [--.--%] |
|     ( 5 ) nickName | [-----] | [--.--%] |
|     ( 6 ) prefix | [-----] | [--.--%] |
|     ( 7 ) suffix | [-----] | [--.--%] |
|     ( 8 ) surname | [Smith] | [100.00%] |
|   ( 9 ) sex | [A] | [83.86%] |
|   ( 10 ) dateOfBirth | [-----] | [--.--%] |
|   ( 11 ) city | [Palo Alto] | [100.00%] |
|   ( 12 ) state | [CA] | [100.00%] |
|   ( 13 ) street | [abc] | [61.50%] |
|   ( 14 ) zipcode | [94020] | [100.00%] |

TRANSFORMING DATA FOR A TARGET SCHEMA

BACKGROUND

Mapping raw domain specific data to a unified data model allows for the rapid development of analytics, which can run on a large amount of data. Mapping raw domain specific data to a unified model is a time consuming and challenging task. For example, healthcare systems typically use health level 7 (HL7) messages to exchange protected health information (PHI). HL7 messages are formatted using a well-defined schema. However, the use of HL7 messages is not strictly enforced. This means that different health systems represent the same data using HL7 messages in different ways. Handling HL7 content from different customers is both time consuming and difficult. HL7 messages typically require custom analytics to be written for each individual system, which is challenging, time consuming, and error prone.

SUMMARY

Disclosed herein is a method for transforming data for a target schema, and system and computer program product as specified in the independent claims. Embodiments are given in the dependent claims. Embodiments can be freely combined with each other if they are not mutually exclusive.

Embodiments generally relate to transforming data for a target schema. In some embodiments, a method includes receiving input data, where the input data includes a plurality of segments, and where the segments include a plurality of source fields containing target data. The method further includes characterizing the input data based at least in part on a plurality of predetermined metrics, where the predetermined metrics determine a structure of the input data. The method further includes mapping the target data in the source fields of the segments to a plurality of target fields of a target schema based at least in part on the characterizing. The method further includes populating the target fields of the target schema with the target data from the source fields based at least in part on the mapping.

In an embodiment, the input data is semi-structured data. In another aspect, the target schema is a structured schema. In another aspect, to characterize the input data, the method further includes determining contextual information associated with the input data. In another aspect, to map the target data in the source fields of the segments to the target fields of a target schema, the method further includes: comparing each target field to contextual information associated with each segment; and matching the target data in each source field to one of the target fields of the target schema based at least in part on the comparing of each target field to the contextual information. In another aspect, the mapping of the target data in the source fields of the segments to the target fields of a target schema is based at least in part on confidence values, and where the confidence values indicate degrees of matching between the target data and one or more target fields. In another aspect, to map the target data in the source fields of the segments to the target fields of a target schema, the method further includes: determining confidence values, where the confidence values indicate degrees of matching between the target data and one or more target fields; and matching the target data in the source fields to the target fields of the target schema.

BRIEF DESCRIPTION OF THE DRAWINGS

FIG. 6 illustrates an example mapping of target data to a target schema, according to some embodiments.

DETAILED DESCRIPTION

Embodiments described herein facilitate the transformation of data for a target schema. Embodiments automate transformation of heterogeneous data, which may not conform to existing known schema mappings to a structured target schema. For example, embodiments may transform semi-structured health level 7 (HL7) source messages to target schema such as a unified data model. While some embodiments are described herein in the context of HL7 messages, these embodiments and others also apply to messages based on other protocols and/or data schemas.

In some embodiments, a system receives input data, where the input data includes multiple segments, and where each segment includes one or more source fields containing target data. The system further characterizes the input data based at least in part on predetermined metrics, where the predetermined metrics determine a structure of the input data. The system further maps the target data in the source fields of the segments to target fields of a target schema based at least in part on the characterizing. The system further populates the target fields of the target schema with the target data from the source fields based at least in part on the mapping.

Figure 1:
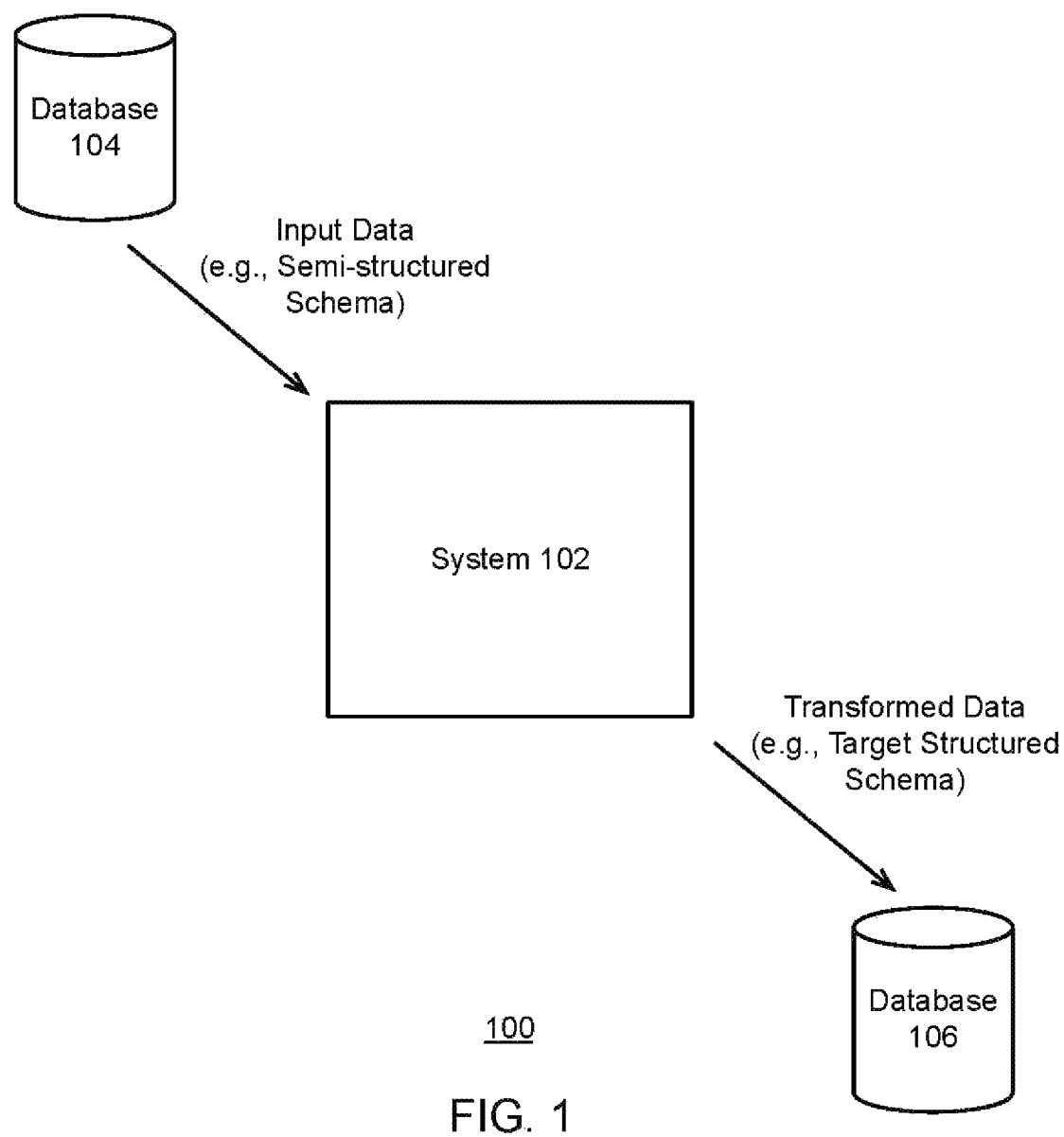
FIG. 1 illustrates an example environment for transforming data for a target schema, according to some embodiments.

FIG. 1 is an example environment 100 for transforming data for a target schema, according to some embodiments. Shown are a system 102, a database 104, and a database 106. In some implementations, database 104 may be referred to as a source database, which may provides the raw input data. Also, database 106 may be referred to as a target database, which may stored the transformed data for a target schema. As described in more detail herein, system 102 receives input data from database 104. In some embodiments, the input data may be raw data organized in a semi-structured schema. For example, the input data may be HL7 data. While some embodiments are described herein in the context of health data such as HL7 data, these embodiments and others may be applied to any type of data. As described in more detail herein, system 102 transforms the input data for a target schema, and stores the transformed data in database 106.

For ease of illustration, databases 104 and 106 are shown as being separate from system 102, and databases 104 and 106 may be external to system 102. In some embodiments, database 104 and/or database 106 may be integrated with system 102. In various embodiments server 102 may communicate with databases 104 and 106 via wired and/or wireless connections associated with any suitable network or combination of networks. In various embodiments, databases 104 and 106 may be stored on the same server, which may be a part of or integrated with system 102.

For ease of illustration, FIG. 1 shows one block for each of system 102, database 104, and database 106. Blocks 102, 104, and 106 may represent multiple systems and databases.

In other implementations, environment 100 may not have all of the components shown and/or may have other elements including other types of elements instead of, or in addition to, those shown herein.

While the system 102 performs embodiments described herein, in other embodiments, any suitable component or combination of components associated with the system 102 or any suitable processor or processors associated with the system 102 may facilitate performing the embodiments described herein. In various embodiments, the environment 100 may not have all of the components shown and/or may have other elements including other types of components instead of, or in addition to, those shown herein.

Figure 2:
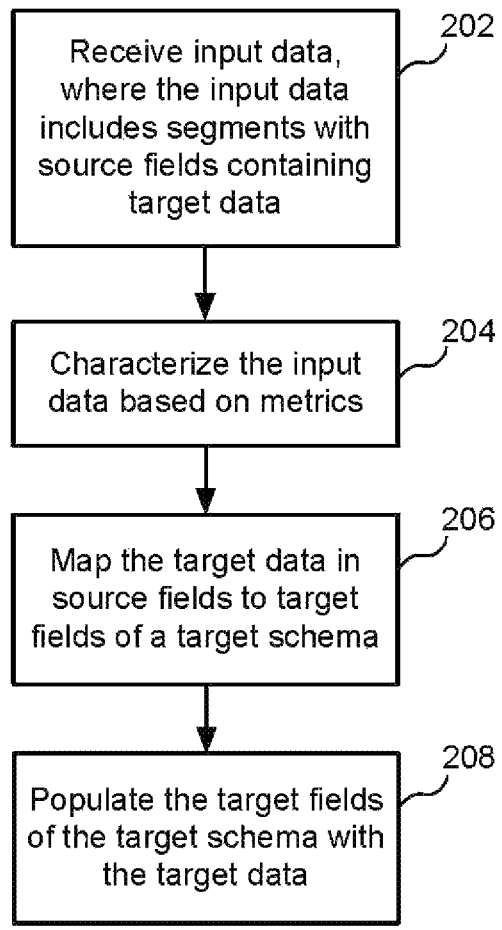
FIG. 2 is an example flow diagram for transforming data for a target schema, according to some embodiments.

FIG. 2 is an example flow diagram for transforming data for a target schema, according to some embodiments. As described in more detail herein, a system take data that may be semi-structured or unstructured and transforms the data for a structured target schema. In some embodiments, the system may receive and transform input data that is structured data that does not conform to the new structured target schema. As such, while some embodiments are described herein in the context of non-structure or semi-structured input data, these embodiments and other also apply to structured input data. Referring to both FIGS. 1 and 2, a method begins at block 202, where a system such as system 102 receives input data. In various embodiments, the input data may be referred to as a story. As described in more detail herein, the input data includes a multiple segments, where the segments include source fields containing target data.

Figure 3:
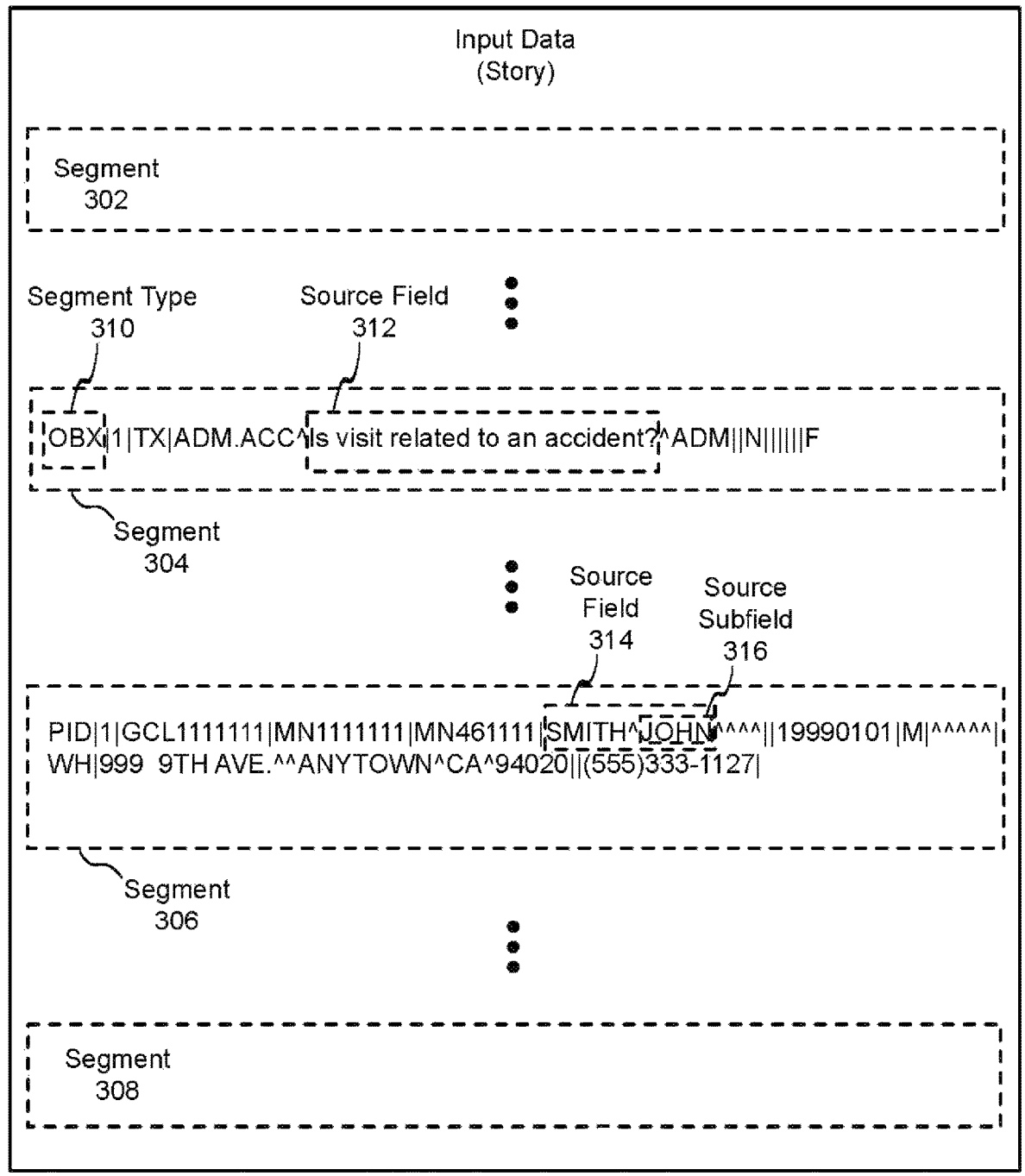
FIG. 3 illustrates example input data, according to some embodiments.

FIG. 3 illustrates example input data 300, according to some embodiments. As indicated above, input data 300 may be referred to as a story. As shown, input data 300 includes segments 302, 304, 306, and 308. In various embodiments, each segment may be a field or a sequence of field(s) that used to request the target data from a database. In this particular embodiment, segments 302, 304, 306, and 308 are used to request the target data from a database. In various embodiments, a segment is a group of fields that contain varying types of data. Each segment exists independently and may be utilized in multiple messages, in varying sequences, throughout a given standard (e.g., HL7 standard, etc.). Segments may be used for a particular message or may be optional.

Segments 302, 304, 306, and 308 of the input data or story may be referred to as story segments. For ease of illustration, four story segments are shown. The actual number of segments in a story may vary depending on the particular implementation.

Segments 304 and 306 shows example data in an HL7 data format. For example, segment 304 includes data indicating a segment type 310. For example, an OBX type segment may be used for data associated with observations (e.g., a clinician collecting and documenting information about a patient.) Segment 304 also includes a source field 312, which may include data entered by a user (e.g., "Is visit related to an accident.") The other segments 302 and 308 also include source fields and target date, which are not shown for ease of illustration. The particular content of a given segment may vary, depending on the particular implementation.

Segment 306 includes a source field 314, which contains name information. As shown, source field 314 contains name information (e.g., John Smith), and source field 314 includes subfields such as source subfield 316. Source subfield 316 contains first name information (e.g., John). In various embodiments source field 314 and source subfield 316 are sources of target data to be transformed for the target schema.

In some implementations, the input data is semi-structured data, where the input data may be organized in a semi-structured schema. In various embodiments, the particular structure may vary, depending on the particular implementation. For example, a semi-structured schema may include tables with rows and columns.

In some embodiments, a particular schema is semi-structured in that users can use content in a given field for different purposes. Different hospitals may populate HL7 fields differently from each other, or in an inconsistent manner. For example, a hospital A may use an OBX type segment for observations, and hospital B may use an OBX type segment for demographic information. In various scenarios, even if input data is in a semi-structured or even structured schema, the organization of the input data may not comply with the schema. This is because there is no strict enforcement of usage, even within the same hospital. Errors can exist in different segments. This can cause problems when mapping data from one schema to another. Building new mapping for each new hospital is prohibitively labor intensive.

Figure 4:
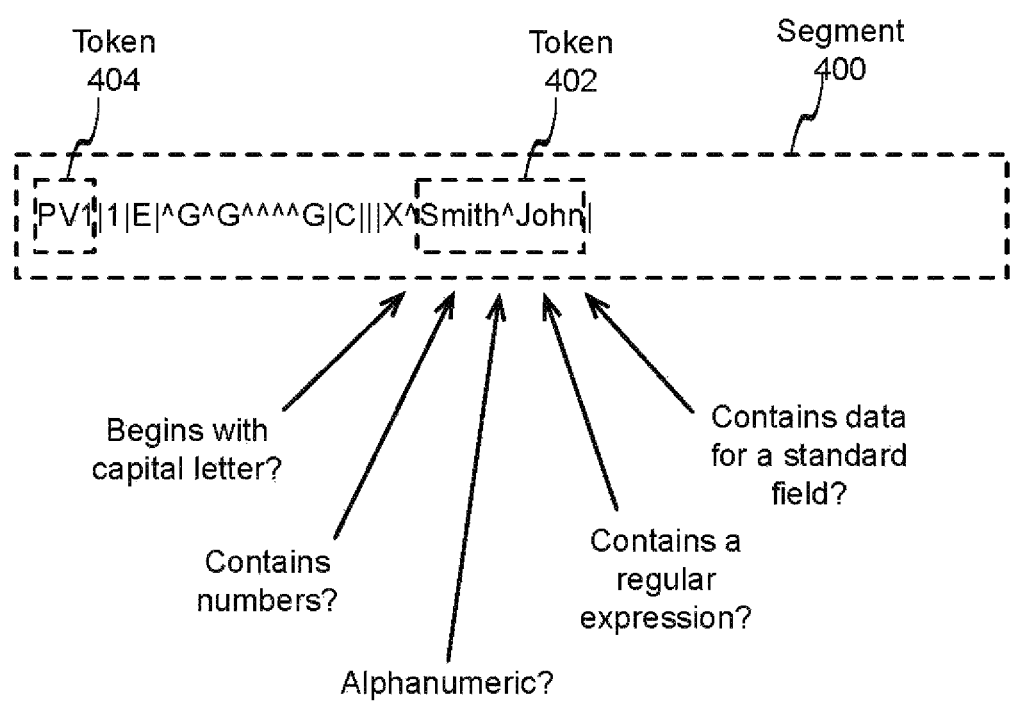
FIG. 4 illustrates an example segment and token, according to some embodiments.
Figure 5:
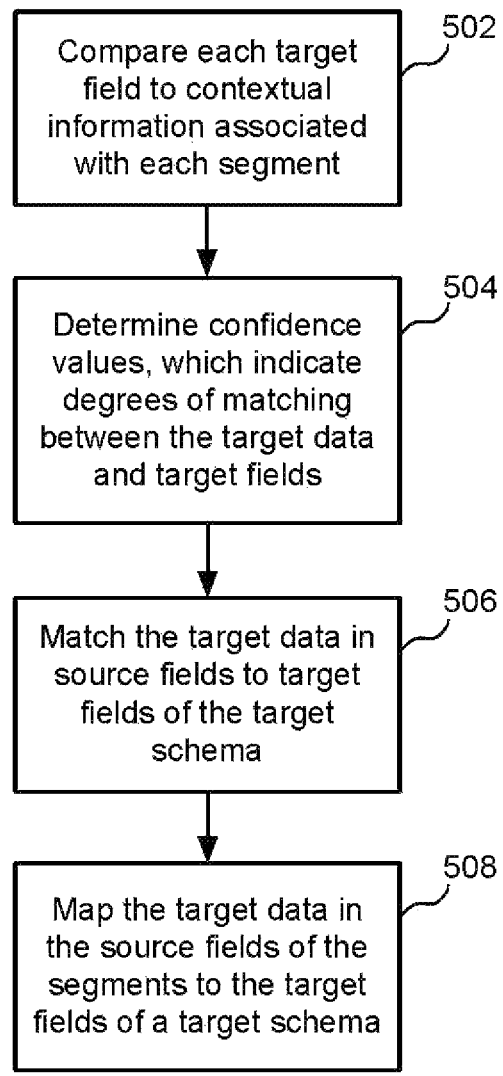
FIG. 5 is an example flow diagram for mapping target data to a target schema, according to some embodiments.

As described in more detail herein in connection with FIGS. 4, 5, and 6, embodiments avoid this problem by applying metrics to the target data in the source fields of the segments. As described in more detail herein, the system automatically maps raw messages (e.g., HL7 messages, etc.) to a generalized, structured target schema such as a unified data model for healthcare (UDMH).

In some embodiments, the input data is unstructured data. For example, the input data may be free text. In some embodiments, the system may use natural language processing to extract features of unstructured data.

At block 204, the system characterizes the input data based at least in part on predetermined metrics. In various implementations, the predetermined metrics determine a structure of the input data. Such predetermined metrics are described in more detail below.

In various embodiments, the system extracts attributes or features from each segment of the input data. These features describe both the structure of the segment and the contents of the segment using a variety of heuristics along with natural language processing. In some embodiments, the system identifies the data type, and the data schema standard version or standard (e.g., HL7 v2.3, HL7 v2.5, HL7 v2.7, etc.).

In various embodiments, the system converts the input data to a particular intermediary format. Example intermediary formats may include extensible markup language (XML), JavaScript object notation (JSON), resource description framework (RDF) schema, etc.

In various implementations, to characterize the input data, the system determines contextual information associated with the input data or story. To determine the contextual information, the system parses the segments of the input data into tokens and computes metrics on the tokens. In some embodiments, some metrics may be computed, and some metrics may be defined by a domain expert. Each token is data contained in a particular source field. As each token is considered for inclusion in a target field of the target schema, the term token may be used interchangeably with the term target data.

FIG. 4 illustrates an example segment 400 and token 402, according to some embodiments. In various embodiments, the system computes metrics on each token such as token

402. These metrics provide the contextual information for characterizing the input data, and, more particularly, each token of the input data. In various embodiments, a token is the target data in a given source field. In this example, token 402 is a person's name, John Smith. As described in more detail herein, the system determines an appropriate target field in the target schema to place the token or target data. This process is referred to as a mapping process, which is described in more detail herein.

In various embodiments, the contextual information includes one or more features of the tokens in each segment. The features of a given token include one or more relationships between the token and one or more portions of the input data. The metrics qualify and quantify the features. As described in more detail below, the system determines the degree to which a given token, also referred to as target data, fits or matches a specific target field in the target schema.

In various embodiments, the metrics take into account both the structure and value of tokens of the input data in order to effectively characterize the tokens, as well as to identify unseen tokens that do not conform to existing known mappings or ambiguous mappings.

In various embodiments, the metrics fall into various categories metrics or metric categories, each of which include various questions. Example metrics and associated questions and described in more detail herein. The system analyzes various aspects of the input data or story in order to determine answers to the questions. These answers may be referred to as features. These features characterize the tokens, which characterize the input data overall. As such, the features constitute contextual information.

In some embodiments, one metric category may be referred to as a token metrics. The system scans the input data to determine characteristics of individual tokens. For example, the system may determine if a token begins with a capital letter, which may indicate a proper name of person (e.g., a patient name, etc.), etc. The system may determine if a token contains numbers, which may indicate an age, a phone number, an address, etc. The system may determine if a token is alphanumeric, which indicates an address, prescription drug identifier, product identifier, etc. The system may determine how many characters there are in a token, or if a token fits a certain regular expression (regex), which may indicate a phone number, social security number, medical record number, etc. The system may determine if the token is in a standard field (e.g., first name, last name, etc.), where the system may determine if the data conforms to the field (e.g., letters conform to a last name field, etc.). They system may determine if the value of the token conforms to an expected range of a known field. For example, an numeric value between 18 and 30 that may conform to a body mass index (BMI) field but would not conform to a heart rate field. Conversely, a numeric value between 40 and 100 may conform to a heart rate field, but would not conform to a BMI field. For a given numeric value, the system may identify or eliminate particular candidate target fields for matching. The system may take into account average or standard deviations, as well as other contextual information to characterize a given token.

In some embodiments, one metric category may be referred to as a token-story metrics. The system scans the input data to determine characteristics of individual tokens relative to the overall input data or story, or the token and story relationship. For example, in some embodiments, the system may determine which particular line of the story the token appears on. In some embodiments, a line may be an actual line or of text in the story. In some embodiments, a single segment may be a single line in a story (e.g., segment 304 of FIG. 3). The particular number of lines that a segment occupies may vary depending on the particular implementation. For example, in some embodiments, a segment may be two lines in a story (e.g., segment 306 of FIG. 3).

For example, the first line or segment in a story may have a particular significance, where the system may expect certain tokens on certain lines. The system may determine how many lines the segment is that contains the token. A longer segment may indicate tokens with more information, or may indicate a segment with numerous tokens, or may indicate the presence of numerous related tokens (e.g., address tokens, etc.), etc.

In some embodiments, one metric category may be referred to as token-SchemaField metrics. The system scans the input data to determine characteristics of individual tokens relative to the field, also referred to as a schema field. This may be referred to as the token and field relationship. For example, in some embodiments, the system may determine if the same token frequently appears in the schema field, which may indicate prescription information. The system may determine how far the token is from the beginning of a segment. As shown, token 402 is at the end of the segment, which may indicate a token in a name field. The system may determine if the syllables or symbols (e.g., |, ^, &, #, etc.) in the token appear frequently in the schema field. Each symbol may have different meanings in different schemas. For example, in HL7, a pipe symbol "|" separates tokens. As such, the system may identify tokens between pipe symbols.

In some embodiments, one metric category may be referred to as a token-SchemaStructure metrics. The system scans the input data to determine characteristics of individual tokens relative to the schema structure. For example, in some embodiments, the system may determine if there is a good token candidate for a token root. For example, the system may determine how far the token is from the beginning of a segment. For example, in HL7, the first token of a line may indicate the type of segment. Referring to segment 400, a token 404 in the first position indicates the segment type. In this example, "PV1" indicates a patient visit segment type. The system may determine how far the token is from siblings in the schema structure. For example, a set of related tokens (e.g., profile information may be grouped to be in the same segment, in adjacent segments, and/or in nearby segments, etc.).

While four categories are described, there may be more categories or fewer categories, depending on the particular implementation. Furthermore, some categories may overlap such that the same or similar features may be expressed and recorded from two or more question in one or more metric categories. As indicated herein, the determined features determined by the metrics constitute the contextual information for characterizing the tokens for mapping to the target fields of the target schema. As described in more detail herein, the system determines a confidence level that a particular token fits or matches a particular target field of the target schema.

In various embodiments, the system may derive metrics ranks from a combination of expertise domain knowledge and experience and the learned results of one or more particular machine learning algorithms. While the system may access metrics from various experts, the system may use machine learning to provide precision ranking.

Referring again to FIG. 2, at block 206, the system maps the target data in the source fields of the segments to target fields of a target schema based at least in part on the characterizing of block 204. In some implementations, the system receives or accesses the target schema. As indicated herein, in various implementations, the target schema is a structured schema. The system parses the target schema into objects in order to build a schema tree structure in memory. The system then maps tokens from the story to the target schema based on the characterizing. The particular structure schema may vary, and will depend on the particular implementations. For example, the target schema may be a unified data module for healthcare (UDMH). The system records which tokens are mapped to which schema fields, and stores the mapping in a suitable storage location. Example embodiments directed to the mapping of the target data in the source fields to target fields of a target schema are described in more detail below, in connection with FIG. 5.

At block 208, the system populates the target fields of the target schema with the target data from the source fields based at least in part on the mapping. In various embodiments, the system transforms the input data for the target schema by transferring the target data to the appropriate target fields of the target schema based on the mapping of block 206.

FIG. 5 is an example flow diagram for mapping target data to a target schema, according to some embodiments. As described in more detail herein, the system receives input data that may be semi-structured or unstructured and transforms the target data for a structured target schema. The following flow diagram may be used to implement the mapping block 206 of FIG. 2, where target data in the source fields of the segments of the input data are mapped to the target fields of a target schema. Referring to both FIGS. 1 and 2, a method begins at block 502, where a system compares each target field to contextual information associated with each segment of the input data.

FIG. 6 illustrates an example mapping 600 of target data to a target schema, according to some embodiments. Shown are example schema elements 602 (e.g., person, person ID, humanName, etc.). Also shown are target fields 604, some of which have candidate tokens or target data (e.g., 31240040, John, A, Smith, etc.). Also shown are confidence values 606. In this example, the confidence values are percentages. Confidence values 606 may be referred to as confidence levels or confidence scores, and confidence values may have units other than percentages.

At block 504, the system determines confidence values, where the confidence values indicate degrees of matching between the target data and one or more target fields. As shown in FIG. 6, the target data "31240040" in the target field corresponding to the schema element "personID" has a confidence value of 100.00%. This indicates a 100% match, meaning that target data "31240040" is a person identifier and correctly maps to the target schema element "personID." In another example, the target data "John" in the target field corresponding to the schema element "given" has a confidence value of 100.00%. This indicates a 100% match, meaning that the target data "John" is a person identifier and correctly maps to the target schema element "given." In another example, the target data "A" in the target field corresponding to the schema element "sex" has a confidence value of 83.86%. This indicates an 83.86% match, meaning that target data "A" is designates a sex or gender and may map to the target schema element "sex."

In some embodiments, the system may use a logistic regression approach to effectively use the metrics to learn which target data conform and which do not conform to existing known schema mappings. The particular techniques used may vary, depending on the particular implementations. For example, the system may use linear regression techniques. The system may use such techniques, whether logistic regression techniques or linear regression techniques, to detect anomalies (e.g., if two hospitals are populating a given field differently, etc.). This enables the system to automatically learn flexible mapping that accommodates the same message from different hospitals simultaneously. In some embodiments, for a given token (e.g., Smith), the system uses the determined features from the characterizing process to compute a feature vector. The system may use the feature vector as part of a training set in a design matrix. The system may use the training matrix for mapping target data (tokens) to fields of interest. As indicated above, the target data may also be referred to as a token. In some embodiments, given a design matrix and feature vector, the system may use logistic regression in order to compute an optimum weight for each feature. Given a schema field with a design matrix, the system may use logistic regression with gradient descent to produce a parameter vector (e.g., theta).

At block 506, the system matches the target data in the source fields to the target fields of the target schema. More specifically, the system matches the target data in each source field to one of the target fields of the target schema based at least in part on the comparing of each target field to the contextual information. In various embodiments, the system may match the target data in each source field to one of the target fields of the target schema based at least in part on the confidence values. For example, referring still to FIG. 6, the system may match all candidate target data with a confidence value of 100% to the respective target fields. In some embodiments, the system may match candidate target data with a confidence value above a predetermined confidence threshold (e.g., 60%, 70%, etc.) to the respective target fields. As such, the system may ignore (not match) candidate target data with a confidence value below the predetermined confidence threshold to the respective target fields.

At block 508, the system maps the target data in the source fields of the segments to the target fields of a target schema based on the matching. In various implementations, the mapping of the target data in the source fields of the segments to the target fields of a target schema is based at least in part on confidence values, and where the confidence values indicate degrees of matching between the target data and one or more target fields.

In various embodiments, the system may train several machine learning models (e.g., logistic regression, support vector machines, neural networks, etc.) to learn how to map target data to the target schema. The system uses such trained models to automatically identify the most likely target data to map to the target fields of the target schema. The system may also leverage the trained models to perform error detection on segments.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Embodiments significantly reduce the amount of development time needed to map ambiguous, heterogenous data to target schema. As indicated above, the system automatically maps raw messages (e.g., HL7 messages, etc.) to a generalized, structured target schema such as a unified data model for healthcare (UDMH). By map the raw messages to a structured target schema, analytics can be written once for the structure target schema as opposed to writing custom code for each system.

Automating the mapping significantly reduces the time taken to support semi-structured or unstructured messages coming from a new provider. Embodiments automatically identify fields in unseen input data messages, which may be different from expected. A difference could occur due to errors in entered data (e.g., wrong field used). Embodiments both reduce development time as well as wasted processing time due to errors.

By mapping the raw messages to a structured target schema, analytics can be written once for the structure target schema as opposed to writing custom code for each system. Also, the system may perform calculations at the time the target database is being populated rather than needing to later create new views out of the target database information. Furthermore, the system may generate addition metadata from the characterizing for further processing of the input data.

Figure 7:
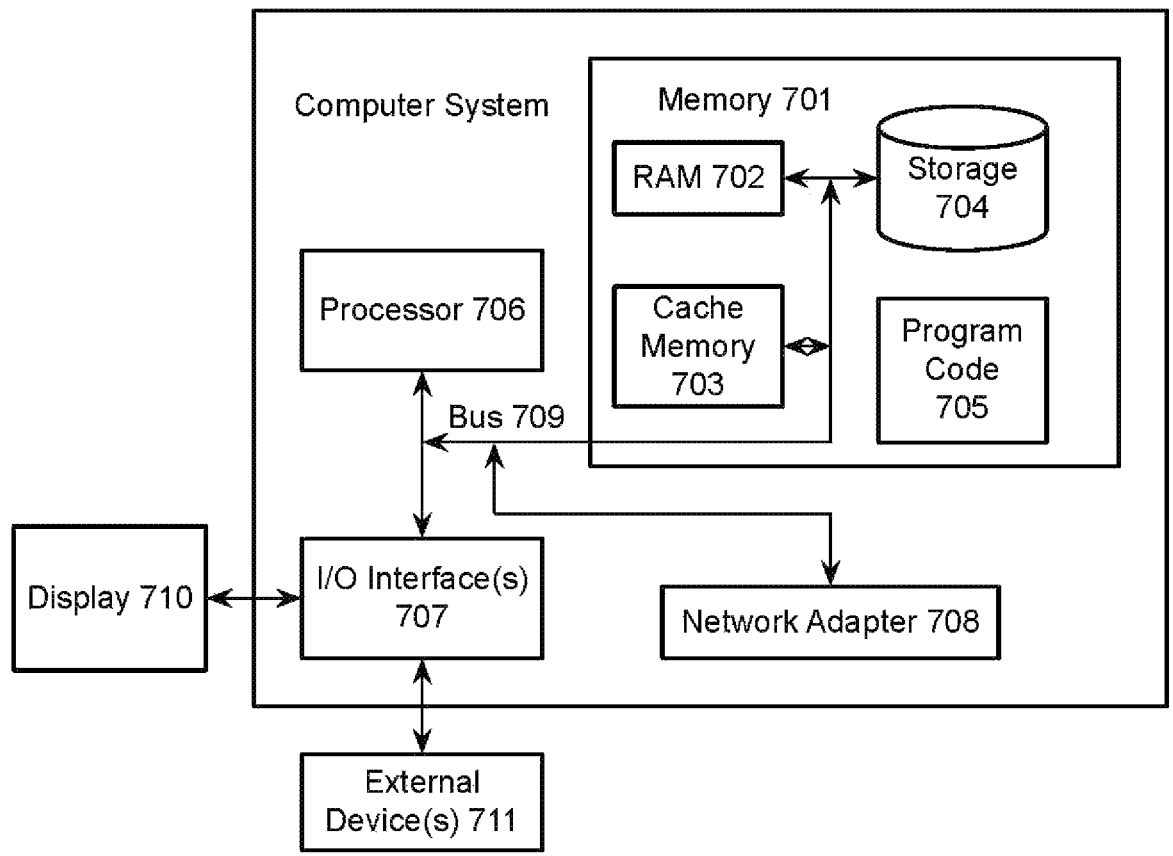
FIG. 7 is a block diagram of an example computer system, which may be used for embodiments described herein.

FIG. 7 is a block diagram of an example computer system 700, which may be used for embodiments described herein. The computer system 700 is operationally coupled to one or more processing units such as processor 706, a memory 701, and a bus 709 that couples various system components, including the memory 701 to the processor 706. The bus 709 represents one or more of any of several types of bus structure, including a memory bus or memory controller, a peripheral bus, an accelerated graphics port, and a processor or local bus using any of a variety of bus architectures. The memory 701 may include computer readable media in the form of volatile memory, such as random access memory (RAM) 702 or cache memory 703, or storage 704, which may include non-volatile storage media or other types of memory. The memory 701 may include at least one program product having a set of at least one program code module such as program code 705 that are configured to carry out the functions of embodiment of the present invention when executed by the processor 706. The computer system 700 may also communicate with a display 710 or one or more other external devices 711 via input/output (I/O) interfaces 707. The computer system 700 may communicate with one or more networks via network adapter 708.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
    at least one processor and a non-transitory computer readable storage medium having program instructions embodied therewith, the program instructions executable by the at least one processor to cause the at least one processor to perform operations comprising:
    receiving input data, wherein the input data includes a plurality of segments, and wherein the segments include a plurality of source fields;
    parsing each of the segments into tokens, wherein each token is data that is contained in a particular source field of the plurality of source fields, and wherein each token includes at least one alphanumeric or numeric value;
    determining contextual information associated with each token, wherein the contextual information comprises one or more features associated with each token, and wherein determining the contextual information comprises determining one or more features of each token based on metrics and determining whether the numeric value of a given token conforms to an expected range of a first numeric target field versus a second numeric target field based on a type of the target field;
    mapping the tokens in the source fields of the segments to a plurality of target fields of a target schema based at least in part on the contextual information and confidence values, and wherein the confidence values that meet one or more confidence value thresholds indicate degrees of matching between each token and one or more target fields; and
    populating the target fields of the target schema with the tokens from the source fields based at least in part on the mapping, wherein the parsing of the segments into tokens, the determining of the contextual information associated the tokens, and the mapping of the tokens in the source fields to the target fields is performed substantially during the populating the target fields of the target schema with the tokens from the source fields.

2. The system of claim 1, wherein the input data is semi-structured data.

3. The system of claim 1, wherein the target schema is a structured schema.

4. The system of claim 1, wherein the structure of each token comprises a relationship between one or more structural features of each token and at least one other token in a same segment.

5. The system of claim 1, wherein, to map the tokens in the source fields of the segments to the target fields of a target schema, the at least one processor further performs operations comprising:
    comparing each target field to the contextual information associated with each token; and
    matching the token in each source field to one of the target fields of the target schema based at least in part on the comparing of each target field to the contextual information.

6. A computer program product comprising a non-transitory computer readable storage medium having program instructions embodied therewith, the program instructions executable by at least one processor to cause the at least one processor to perform operations comprising:
    receiving input data, wherein the input data includes a plurality of segments, and wherein the segments include a plurality of source fields;
    parsing each of the segments into tokens, wherein each token is data that is contained in a particular source field of the plurality of source fields, and wherein each token includes at least one alphanumeric or numeric value;
    determining contextual information associated with each token, wherein the contextual information comprises one or more features associated with each token, and wherein determining the contextual information comprises determining one or more features of each token based on metrics and determining whether the numeric value of a given token conforms to an expected range of a first numeric target field versus a second numeric target field based on a type of the target field;
    mapping the tokens in the source fields of the segments to a plurality of target fields of a target schema based at least in part on the contextual information and confidence values, and wherein the confidence values that meet one or more confidence value thresholds indicate degrees of matching between each token and one or more target fields; and populating the target fields of the target schema with the tokens from the source fields based at least in part on the mapping, wherein the parsing of the segments into tokens, the determining of the contextual information associated the tokens, and the mapping of the tokens in the source fields to the target fields is performed substantially during the populating the target fields of the target schema with the tokens from the source fields.

7. The computer program product of claim 6, wherein the input data is semi-structured data.

8. The computer program product of claim 6, wherein the target schema is a structured schema.

9. The computer program product of claim 6, wherein the structure of each token comprises a relationship between one or more structural features of each token and at least one other token in a same segment.

10. The computer program product of claim 6, wherein, to map the tokens in the source fields of the segments to the target fields of a target schema, the at least one processor further performs operations comprising:
    comparing each target field to the contextual information associated with each token; and
    matching the token in each source field to one of the target fields of the target schema based at least in part on the comparing of each target field to the contextual information.

11. The computer program product of claim 6, wherein, to map the tokens in the source fields of the segments to the target fields of a target schema, the at least one processor further performs operations comprising:
    determining confidence values, wherein the confidence values indicate degrees of matching between each token and one or more target fields; and
    matching tokens in the source fields to the target fields of the target schema.

12. A computer-implemented method for transforming data for a target schema, the method comprising:
    receiving input data, wherein the input data includes a plurality of segments, and wherein the segments include a plurality of source fields;
    parsing each of the segments into tokens, wherein each token is data that is contained in a particular source field of the plurality of source fields, and wherein each token includes at least one alphanumeric or numeric value;
    determining contextual information associated with each token, wherein the contextual information comprises one or more features associated with each token, and wherein determining the contextual information comprises determining one or more features of each token based on metrics and determining whether the numeric value of a given token conforms to an expected range of a first numeric target field versus a second numeric target field based on a type of the target field;
    mapping the tokens in the source fields of the segments to a plurality of target fields of a target schema based at least in part on the contextual information and confidence values, and wherein the confidence values that meet one or more confidence value thresholds indicate degrees of matching between each token and one or more target fields; and
    populating the target fields of the target schema with the tokens from the source fields based at least in part on the mapping, wherein the parsing of the segments into tokens, the determining of the contextual information associated the tokens, and the mapping of the tokens in the source fields to the target fields is performed substantially during the populating the target fields of the target schema with the tokens from the source fields.

13. The method of claim 12, wherein the input data is semi-structured data.

14. The method of claim 12, wherein the target schema is a structured schema.

15. The method of claim 12, wherein the structure of each token comprises a relationship between one or more structural features of each token and at least one other token in a same segment.

16. The method of claim 12, wherein, to map the tokens in the source fields of the segments to the target fields of a target schema, the method further comprises:
    comparing each target field to the contextual information associated with each token; and
    matching the token in each source field to one of the target fields of the target schema based at least in part on the comparing of each target field to the contextual information.

\* \* \* \* \*